(12) United States Patent
Krul et al.

(10) Patent No.: US 7,032,828 B2
(45) Date of Patent: Apr. 25, 2006

(54) SUBSTRATE WHICH IS MADE FROM PAPER AND IS PROVIDED WITH AN INTEGRATED CIRCUIT

(75) Inventors: Johannes Krul, Beuningen (NL); Wilhelm Bernardus de Hesse, Twello (NL); Marco Matters, Eindhoven (NL); Cornelis Maria Hart, Eindhoven (NL); Dagobert Michel De Leeuw, Eindhoven (NL)

(73) Assignees: VHP Veiligheidspapierfabriek Ugchelen B.V., Apeldoorn (NL); Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/983,000

(22) Filed: Nov. 8, 2004

(65) Prior Publication Data

US 2005/0109851 A1 May 26, 2005

Related U.S. Application Data

(63) Continuation of application No. 09/692,371, filed on Oct. 20, 2000, now Pat. No. 6,830,192, which is a continuation of application No. PCT/NL99/00220, filed on Apr. 15, 1999.

(30) Foreign Application Priority Data

Apr. 20, 1998 (NL) .................................. 1008929

(51) Int. Cl.
*G06K 19/06* (2006.01)

(52) U.S. Cl. ........................ 235/492; 235/487; 283/83; 257/40

(58) Field of Classification Search ................ 235/487, 235/492, 441, 451; 902/1, 25, 26, 29; 283/72, 283/83, 98, 86, 70; 162/163; 340/572.7, 340/572.1, 572.8; 257/40, 774; 361/725; 359/2

See application file for complete search history.

(56) References Cited

U.S. PATENT DOCUMENTS

| | | | |
|---|---|---|---|
| 4,218,674 A | 8/1980 | Brosow et al. | |
| 4,504,357 A | 3/1985 | Holbein et al. | |
| 4,763,927 A | 8/1988 | Schneider | |
| 5,108,819 A | 4/1992 | Heller et al. | |
| 5,112,672 A | 5/1992 | Kaule et al. | |

(Continued)

FOREIGN PATENT DOCUMENTS

DE          44 31 603          3/1996

(Continued)

OTHER PUBLICATIONS

"Currency with an Integrated Chip", IBM Technical Disclosure Bulletin, vol. 32, No. 5A, Oct. 1989, p. 427.

(Continued)

*Primary Examiner*—Jared J. Fureman
(74) *Attorney, Agent, or Firm*—Oblon, Spivak, McClelland, Maier & Neustadt, P.C.

(57) ABSTRACT

The invention relates to a substrate which is made from paper and is provided with at least one integrated circuit which is produced from a semiconductive organic polymer. A semiconductive organic polymer of this nature, when used as the base material for the integrated circuit, leads to the possibility of directly producing the substrate in the required thickness, to the need for support layers and/or protective layers being eliminated, and to the possibility of reducing the cost price of the substrate compared to substrates which comprise an integrated circuit of the silicon type.

22 Claims, 2 Drawing Sheets

U.S. PATENT DOCUMENTS

| | | | |
|---|---|---|---|
| 5,347,144 | A | 9/1994 | Garnier et al. |
| 5,528,222 | A | 6/1996 | Moskowitz et al. |
| 5,566,441 | A | 10/1996 | Marsh et al. |
| 5,876,068 | A | 3/1999 | Schneider et al. |
| 5,888,624 | A | 3/1999 | Haghiri et al. |
| 6,094,147 | A | 7/2000 | Gerz |
| 6,118,379 | A | 9/2000 | Kodukula et al. |
| 6,126,076 | A | 10/2000 | Lazzerini |
| 6,155,605 | A | 12/2000 | Bratchley et al. |
| 6,255,948 | B1 | 7/2001 | Wolpert et al. |
| 6,486,780 | B1 | 11/2002 | Garber et al. |
| 6,547,151 | B1 | 4/2003 | Baldi |
| 6,918,535 | B1 * | 7/2005 | Brosow .................... 235/379 |
| 2002/0172016 | A1 | 11/2002 | Reiner |
| 2003/0089904 | A1 | 5/2003 | Yoshida et al. |
| 2003/0164611 | A1 | 9/2003 | Schneider, et al. |
| 2003/0206107 | A1 | 11/2003 | Goff et al. |

FOREIGN PATENT DOCUMENTS

| | | |
|---|---|---|
| DE | 196 01 358 | 7/1996 |
| DE | 196 30 648 | 2/1998 |
| DE | 198 49 762 | 5/2000 |
| DE | 100 52 402 | 6/2002 |
| EP | 87/01845 | 3/1987 |
| EP | 0 467 219 | 7/1991 |
| EP | 91/19614 | 12/1991 |
| EP | 0 753 623 | 1/1997 |
| EP | 0 780 027 | 6/1997 |
| EP | 97 24699 | 7/1997 |
| EP | 0 788 075 | 8/1997 |
| EP | 0 860 298 | 8/1998 |
| EP | 99/54842 | 10/1999 |
| EP | 1 179 811 | 2/2002 |
| GB | 2 304 077 | 3/1997 |
| HU | P9700407 | 1/1998 |
| IE | 69045 | 8/1996 |
| JP | 4-91475 | 3/1992 |
| JP | 8-259709 | 10/1996 |
| WO | 96/0/047 | 3/1996 |
| WO | 96/07985 | 3/1996 |
| WO | 96/08054 | 3/1996 |
| WO | 99/30432 | 6/1999 |
| WO | 01-69523 | 9/2001 |

OTHER PUBLICATIONS

"Pentacene Thin Film Transistors and Inverter Circuits", 1997 International Electron Devices Meeting Technical Digest, Dec. 1997, pp. 539-542.

"New plastic circuits are flexible enough to be folded in half", Press Information, Dec. 8, 1997.

May, "Polymer electronics—fact or fantasy?", Physics World, Mar. 1995, pp. 52-57.

"The first all-polymer field effect transistor", Design Engineering, May 1995, pp. 47-48.

Conference Papers EETimes of Dec. 9, 1997, Internet Disclosure, Development of Phillips.

Leeuw, et al., "Polymeric Integrated Circuits and Light-Emitting Diodes", Philips Research Laboratories, 1997, pp. 331-336, no month available.

Brown, et al., "Logic Gates Made from Polymer Transistors and Their Use in Ring Oscillators", Science, vol. 270, Nov. 10, 1995, pp. 972-974.

Bonnoit, et al., "Evaluation des performances de circuits logiques réalizés à partir de transistors MIS organiques", L'Onde Electrique—Juillet-Août, 1994, vol. 74, No. 4, pp. 18-24.

Communication of a Notice of Opposition Against the Equivalent European Patent 1073993, Filed By De La Rue International Limited, Sep. 2003.

Communication of a Notice of Opposition Against the Equivalent European Patent 1073993, Filed By Giesecke & Devrient GmbH, Sep. 2003.

M. Schrodner, et al., Plastic Electronics Based on Semiconducting Polymers, Oct. 2002, First International IEEE Conference on Polymers and Adhesives in Microelectronics and Photonics, ISBN 0-7803-7220-4, pp. 91-94.

Rudolf L. van Renessee, Paper Based Document Security—A Review, Apr. 1997, European Conference on Security and Detection ISBN 0-85296-683-0, pp. 75-80, Apr. 1997.

* cited by examiner

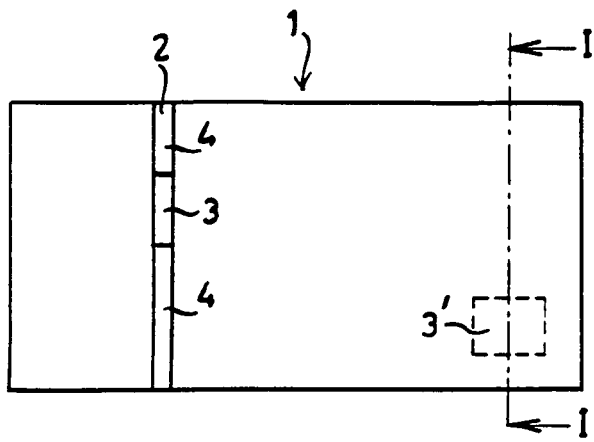
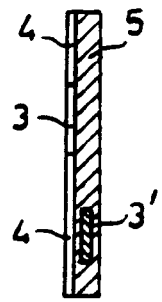
Fig. 1.
Fig. 2.
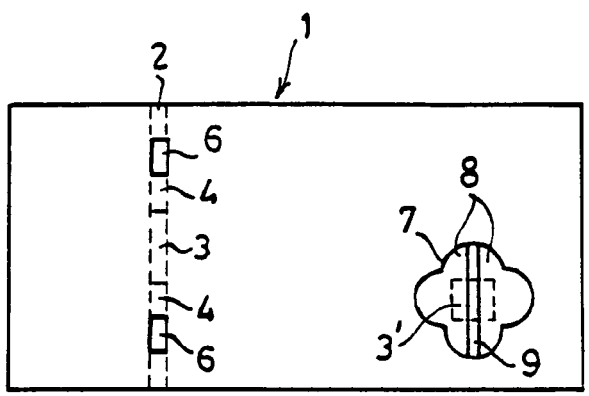
Fig. 3.
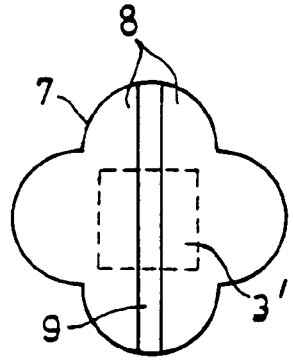
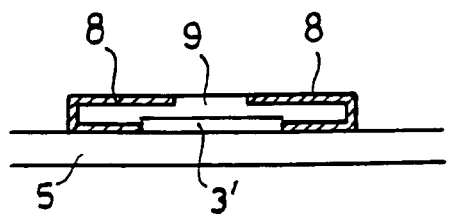
Fig. 4.
Fig. 5.

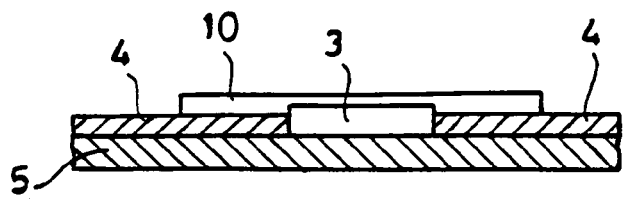
Fig: 6.
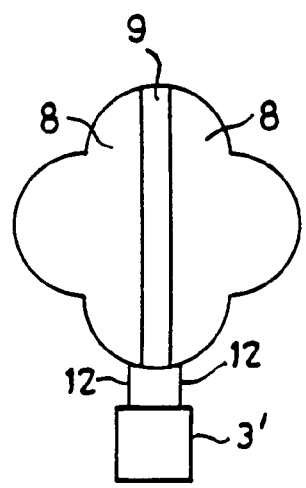
Fig: 8.
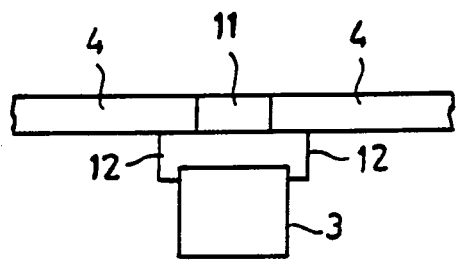
Fig: 7.
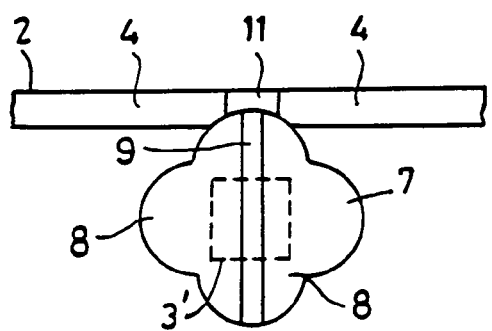
Fig: 9.
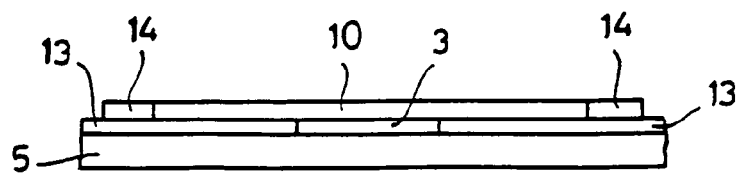
Fig: 10.

SUBSTRATE WHICH IS MADE FROM PAPER AND IS PROVIDED WITH AN INTEGRATED CIRCUIT

CROSS-REFERENCE TO RELATED APPLICATIONS

This application is a Continuation Application of U.S. application Ser. No. 09/692,371 filed on Oct. 20, 2000, now U.S. Pat. No. 6,830,192, which is a Continuation Application of PCT/NL99/00220, filed on Apr. 15, 1999.

FIELD OF THE INVENTION

The invention relates to a substrate which is made from paper and is provided with at least one integrated circuit.

BACKGROUND OF THE INVENTION

A substrate of this nature is known from German Patent Application DE-196 01 358, and is used in security documents and banknotes to protect against forgery and fraud. This known substrate comprises an integrated circuit which is incorporated in the substrate and contains predetermined data. The IC is contactlessly readable and is joined to the substrate in a non-releasable manner. The IC which is used in this substrate is a conventional IC, i.e. of the well-known silicon type. The dimensions of the chip originally produced are reduced by means of etching or polishing, so that the chip acquires the thickness which is desired for it to be incorporated in the paper mass. In order to prevent damage to the crystalline circuits, the IC is reinforced with the aid of a support layer, which also serves to position the IC. Furthermore, the IC is covered with a protective, chemically resistant layer. The lack of flexibility of this known silicon chip is a drawback when a substrate of this nature is used as a security paper, for example in banknotes and identity documents. In addition, the extra layers which are to be included, as well as the additional processing step for producing the appropriate dimensions, lead to an additional increase in the cost price of a substrate of this nature.

The object of the present invention is to provide a paper-based substrate for use in security documents, banknotes and the like, in which an integrated circuit is incorporated, which substrate does not have the drawbacks mentioned above.

SUMMARY OF THE INVENTION

According to the present invention, this object is achieved with a substrate of the type mentioned above in which the integrated circuit comprises a semiconductive organic polymer. This means an electronic circuit which is arranged in the polymer material and the contents of which are programmed in order to assign it a specific function. Polymer chips of this nature are highly flexible and are therefore eminently suitable for use in security documents such as banknotes. Even sharp creases in the chip made from a semiconductive organic polymer do not impede the functioning of the chip. In addition, polymeric ICs can be produced directly in the desired dimensions, in particular with regard to thickness, and the costs of a chip of this nature are lower by approximately a factor of 10 than the current lowest price for a chip of the silicon type.

In the polymeric chip, the nonconductive support on which the semiconductive polymer material is deposited substantially determines the thickness of the overall integrated circuit. It is preferable to use a mechanically strong insulator: plastics with strong intramolecular and intermolecular interactions are particularly suitable for this purpose.

Using an IC of this nature as a security mark in security paper and similar items provides novel and powerful means of protection, since producing these ICs is much too complicated for forgers and generally far exceeds their knowledge and capabilities.

In the context of this application, paper is understood to mean paper which is made from natural or synthetic fibres, as well as "paper" which can nowadays be produced from plastic films, which paper is used for the production of security paper, banknotes and the like.

The integrated circuits may number one or more and may be adjusted as a function of the requirements. For example, with a view to certainty of operation, it is possible to incorporate two or more identical polymer chips, so that in the event of one of these chips failing the substrate and/or the end product which has been produced therefrom can still be used.

BRIEF DESCRIPTION OF THE DRAWINGS

To illustrate the invention further, reference is made to the appended drawing, in which:

FIG. 1 shows a diagrammatic plan view of an embodiment of a banknote according to the invention;

FIG. 2 shows a cross section through the banknote illustrated in FIG. 1, along line I—I;

FIG. 3 shows a diagrammatic plan view of another embodiment of a banknote according to the invention;

FIG. 4 shows an enlarged illustration of an optically active element which is used in the banknote in accordance with FIG. 3;

FIG. 5 shows a cross section through the optically active element illustrated in FIG. 4;

FIG. 6 shows a cross section through yet another embodiment of a banknote according to the invention;

FIG. 7 shows a further embodiment of a security thread with polymeric chip;

FIG. 8 shows another embodiment of an optically active element with polymeric chip;

FIG. 9 shows a combination of a security thread and optically active element; and FIG. 10 shows yet another embodiment of a security thread according to the invention, in cross section.

It should be noted that, in the figures which are to be discussed below, identical components are denoted by identical reference numerals.

DESCRIPTION OF THE PREFERRED EMBODIMENT

Preferably, the organic polymer is selected from conjugated polymers, in particular from oligomeric pentacene, poly(thienylene vinylene) or poly-3 alkylthiophene. An IC which is produced from one of these materials is described by Brown et al. in Science, 270, pp. 972–974, 1995.

As will be understood by the skilled person, the plastic IC, used in the invention, comprises additional layers of different polymers besides the semiconductive polymer layer. For example, the substrate may be produced from polyimide, on which polyaniline blocks are formed, which function as source and drain. On top thereof, the semiconductive polymer layer is present, e.g. comprising poly(thienylene vinylene). This layer is covered by an insulating layer, e.g.

from polyvinylphenol, while a top layer of polyaniline is the uppermost layer, which is the gate.

In an embodiment of the substrate according to the invention, the integrated circuit is contactlessly readable, the data transmission being brought about by an inductive or capacitive route, as is known in the prior art.

In case of inductive readout a coil is needed for the current supply, which has to be connected conductively to the IC; thereby making possible readout from a distance. In order to be able to readout at a small distance it is necessary that the IC contacts a conductor, wherein this conductor together with the measuring apparatus creates a capacity, whereby the current supply and readout become possible.

According to another preferred embodiment of the substrate according to the invention, the substrate comprises a conductive security thread which is connected to the integrated circuit, which security thread serves as a direct contact or indirect contact for the readout and for supplying the current. In a preferred embodiment thereof, the security thread is metallized in order to provide the required electrical conductivity, except at the position of the polymeric IC, where the deposition of metal is interrupted. In the case of direct current supply the metal has to be accessible. Possible ways of providing this accessibility comprise a security thread which is incorporated in the substrate, as well as a security thread which is incorporated in the substrate and the metal parts of which are accessible via so-called windows. Advantageously, one or more integrated circuits are part of the security thread itself. The thickness of this security thread may be adapted to the intended use of the substrate, for example in banknotes. For banknote paper, the thickness of the paper substrate usually lies in the range up to 100 μm. In this case, the thickness of the security thread preferably lies in the range of 15–60% of the thickness of this substrate. If the paper substrate has a different thickness, as for example for a cover of an identity document such as a passport, a minimum thickness of the security thread of approximately 10 μm applies. A thickness greater than 100 μm is relatively meaningless for use in security paper. The preferred embodiment of a polymeric IC in the form of a security thread provides an additional security feature which can easily be recognized by the public. The thread comprising an integrated circuit may additionally comprise a number of other features, such as a dye, fluorescent or phosphorescent material, luminescent material and printed indices.

Organic, conductive polymers can also be used for supplying the current to the chip, although in case of direct contact the mechanical contact properties of these polymers currently still leave something to be desired.

A simple security thread which consists of conductive polymers is proposed in European Patent Application EP-A-0,753,623. However, a thread of this nature has only conductive properties. There are no semiconductor properties, and therefore it is not possible to apply and store a code in a manner which is comparable to a conductive polymer thread in which an integrated circuit is incorporated. The security thread comprising an integrated circuit according to the invention can be arranged in the customary way, for example by being incorporated completely or integrated in the paper mass, in a window or by being attached to the surface of a document. If protection against attack from chemicals is required, a chemically resistant, electrically nonconductive protective layer may be applied to the conductive organic polymers of the chip.

The polymeric chip does not per se have to be completely incorporated in the paper, as is the case for the silicon chip in the German patent application mentioned above. As an alternative, the polymeric IC may also be arranged on the surface of the substrate, using customary techniques for attaching foils, holograms, other optically active elements and the like.

The integrated circuit may also advantageously itself form part of all sorts of optically active elements, such as foils, patches, holograms or kinegrams, which are arranged on or in the substrate as additional security features. As has already been described above with regard to a security thread, according to a further preferred embodiment it is also possible to shape optically active elements of this nature in such a manner that two electrically separate conductive parts of such elements function for readout and current supply, both directly and capacitively. The conductive parts may consist of metal, conductive polymer or a combination thereof.

For protection purposes, the integrated circuit may comprise a preprogrammed code, which code is applied before the chip is incorporated in the substrate.

Advantageously, the integrated circuit comprises a code of an intrinsic property of the substrate in which the circuit is incorporated.

In the current state of the art, the polymer IC may be used only in one direction; i.e. it can be written or programmed once. A preferred way of storing a code in the IC is to use techniques which are derived from cryptology. The authentic code is then stored in the IC in an encrypted manner, and deciphering is impossible without knowing the secret key. Thus, even if unwritten chips could be obtained illegally, the secret key forms a powerful and virtually impregnable barrier preventing the forger from applying a message to security documents and reading this message out. The protection can be improved still further if the optionally partial programming of the chip is carried out after the IC has become part of the security document, as will be explained in more detail below.

The shape of the polymer chip is not critical. Currently, a dimension of approximately 1 mm for a rectangular shape represents the lower limit of a surface dimension if a reasonable number of bits are to be stored in the IC. A rectangular IC of 4 mm by 6 mm currently holds approximately 48 bits, i.e. two bits/mm$^2$. The ratio of the surface dimensions for a polymer chip (i.e. length to width) should preferably not exceed 10:1, owing to the resultant undesirable build-up of the chip given larger ratios. The small dimensions of an IC offer the possibility of covering the chip with additional features which are customarily used in the prior art. The dimensions of such additional features are generally large compared to the dimensions of the polymeric IC. Thus even large ICs, with sufficient memory capacity for storing large quantities of data, can be used without impairing the appearance of the security paper. If a combination of a chip with another security mark is arranged on the security paper, it is necessary to ensure that reading and supplying current to the chip are not adversely affected by an additional security feature of this nature.

The substrate comprising a polymer IC according to the invention is used as a security paper in, for example, banknotes, passports, identity cards and other security documents, such as securities.

The development of an inexpensive integrated circuit of this nature offers a number of novel possibilities for preventing forgery of security documents, beginning with a completely new type of electronics (electronic bar codes) in security paper.

Examples of the use of an IC as a security feature in a document which will be described are the various possibilities for a banknote, but comparable possibilities likewise exist for other types of security documents, such as passports, identity cards and the like.

A first possibility relates to the use of a completely preprogrammed IC in the substrate made from paper. The IC contains one or more codes, if desirable in encrypted form, relating to the banknote. This information may comprise the value, the country, the place and/or time of production, number and the like. For a specific value of the banknote, the information on each chip is substantially identical, i.e. value, country and usually the paper manufacturer and/or printer, and partially different, i.e. production time, production numbers and sometimes paper manufacturer and/or printer.

A more specific protection is obtained with a chip which is partially preprogrammed with a unique code (first code) and an additional second code. This second code is an encrypted translation of the first code. Encryption is carried out using a first key. In the event of verification, the second code is read and the encrypted relationship to the first code is verified using a second key. The second code can be applied to the chip before or after the chip has been arranged in the substrate. An encryption system of this nature is described, by way of example, in WO-A-97/24699.

In this known system, an intrinsic property of the object is coded, encrypted and enciphered. For banknotes, surface properties are taken at a special location, coded, encrypted and stored as a printed pattern on the banknote. In the event of verification, the printed pattern and the surface property are compared with one another using a second key.

Many other properties, as well as properties distributed arbitrarily in the substrate, are used in the prior art for the protection of security documents, cf., inter alia, WO-A-91/19614 (fibre direction), GB-A-230,407 (reflective flakes), U.S. Pat. No. 4,218,764 (magnetic particles or fibres) and WO-A-87/01845 (conductive fibres). In all these cases, arbitrary and therefore unique properties of a document are used for the verification. Hitherto, there has been no suitable-chip available for use in paper substrates in order to store the (encrypted) code, and consequently a coded property was always stored in another way, for example outside the document itself, or was printed in or on the document or recorded magnetically therein. The polymeric chip which is used in the substrate according to the invention makes it technically possible to use and store these protection features inside the document.

The fluorescence properties of arbitrarily distributed fluorescent fibres in a predetermined area of the banknote may be a suitable property. However, any other property which can be measured and is arbitrarily distributed in or on the paper may also be used. A condition is that the property used must be stable throughout the entire lifespan of the document, which means that any property which is highly dependent on the consequences of use, such as soiling, contamination, creasing and the like, is in principle unsuitable.

The coordinates of the relevant part of the banknote where the arbitrary property is determined and, if necessary, the orientation in which the surface must be examined may also be stored in the chip. Thus, when verifying the banknote, a specific parameter is measured along a predetermined path, or an image of the entire banknote is taken, but the assessment is carried out using only the data found at the precoded coordinates. The result of this measurement is compared with the stored code, which likewise refers to the same property at the same location. On the basis of this comparison, which may optionally be encrypted, a rejection or acceptance signal is generated.

The substrate with a polymeric IC according to the invention may furthermore comprise customary security features, such as watermarks, security threads, optically active elements and special chemicals, microprints, etc., standard techniques being used to determine these features.

The invention also relates to a security thread or optically active element comprising an integrated circuit made from a semiconductive organic polymer.

The following example illustrates the invention. In this case, specific fluorescent properties in a specific part of the document are used as an example. Many banknotes are supplied with a number of highly fluorescent fibres which emit different colours of light. These fibres are distributed arbitrarily through the document. The local fluorescence of various types of fibres at a predetermined location can be coded and digitally stored in the chip, optionally in encrypted form, at the time the document is produced, i.e. during the paper manufacturing phase or during the document printing phase. In the event of verification, the area in question is read again using the coordinates and orientation which are stored in the chip, and the results are compared with one another, followed by rejection or acceptance. The said coordinates and orientation will generally differ for each separate banknote, with the result that verification is completely unique for the said document, since the arbitrary property and coordinates are unique for that document. In this way, the chip of each separate banknote contains a unique code which, as it were, represents a finger-print of a specific part of the banknote in question. The code of the intrinsic property may be stored either in encrypted or nonencrypted form.

As has already been mentioned above, the use of the substrate according to the invention is not limited to banknotes. For other uses, such as passports and identity documents, part of a biometric property of the legal owner can be used to generate a digital code which is then stored in the IC of the document. One such example could be a coded part of a digitized photograph of the legal owner, the part to be digitized being determined by coded parameters which are unique for each document. Entirely as for the example given above, verification of the document requires the stored code of the photograph and the code actually read to match one another. Other biometric parameters may also be used, such as fingerprints or parts thereof, which are then stored in coded form in the polymer chip. Here too, it is necessary for the coded, stored feature to be stable.

FIG. 1 shows a banknote 1 made from paper. The banknote 1 comprises a security thread 2 containing a chip 3 made from a semiconductive organic polymer and conductive e.g. metallized parts 4. Furthermore, the banknote 1 comprises a second chip 3', which is likewise made from a semiconductive organic polymer. As can be seen from the cross section in accordance with FIG. 2, the security thread 2 is arranged on the paper 5, while the second polymeric chip 3' is embedded in the paper mass 5. The embedded chip 3' makes contact with a conductor or coil so as to provide the current required and readout.

FIG. 3 shows another embodiment of a banknote 1, in which the security thread 2, which again contains a polymeric chip and conductive parts 4, is incorporated in the paper mass. Sections of the conductive parts 4 are accessible via windows 6 in order to make direct electrical contact, if desired. The banknote 1 illustrated in FIG. 3 also comprises a second chip 3', which in this case is situated beneath an optically active element 7. The optically active element 7 comprises conductive parts 8 which are separated by a strip 9 which is insulating, i.e. nonconductive. The chip 3' can be read and supplied with power via the conductive parts 8, whether directly or from a distance via capacitive coupling. The conductive part may be covered by a chemically inert layer, if readout is done capacitively. If direct contact is required, a part of the conductor and the entire part 9 can be covered in such a way that the IC and conductor are protected (with a nonconducting material), while other parts of the conductor are still accessible to direct contact.

FIG. 4 shows an enlarged view of the optical element 7 with chip 3', while FIG. 5 is a cross section through an optical element 7 of this nature.

FIG. 6 shows a further embodiment of a security thread 2 with a chip made from semiconductive organic polymer 3 and conductive parts 4, which is applied on the paper 5. In this embodiment, the polymer chip and sections of the conductive parts 4 of the security thread 2 are protected by means of a layer 10 of a chemically resistant, electrically nonconductive material. The protecting layer 10 may cover the entire thread, if capacitive coupling is used.

FIG. 7 shows yet another embodiment of a security thread according to the invention, in which the chip 3 does not form part of the security thread itself, but rather is positioned next to it. The conductive parts 4 of the security thread 2 are electrically insulated from one another by means of insulator block 4. The chip 3 is connected to the relevant conductive parts 4 of the security thread via electrical conductors 12.

An embodiment of the same type for an optically active element is illustrated in FIG. 8. The electrical conductors 12 provide the electrical contact between the conductive parts 8 of the optically active element and the polymeric chip 3'.

FIG. 9 shows a combination of a security thread 2 with optically active element 7, the metal parts 4 of the security thread 2 making electrical contact with the metal parts 8 of the optically active element 7. A chip made from semiconductive organic material 3' is situated beneath the optically active element 7.

FIG. 10 illustrates yet another embodiment of a security thread according to the invention. In this embodiment, the security thread is composed of a chip 3 and conductive parts 13, which are made from a conductive polymer. The security thread is arranged on the paper 5. The polymer chip 3 is protected with a layer 10 of chemically resistant material, which also covers (sections of) the conductive polymer 13. In order to ensure a very good supply of power and readout, metal blocks 14 are arranged next to the layer 10 of insulating material, which metal blocks 14 are electrically connected to the conductive organic polymers 13.

In case of a system using capacitive coupling an additional protecting layer may be applied over the metal parts 14 and the chemically resistant layer 10.

What is claimed is:

1. A substrate which is made from paper, comprising:
an optically active element connected to at least one integrated circuit, wherein the integrated circuit is flexible and comprises a semiconductive organic polymer, the optically active element providing conductive parts for readout and current supply of the integrated circuit.

2. The substrate according to claim 1, wherein the organic polymer is at least one conjugated polymer.

3. The substrate according to claim 1, wherein the organic polymer is at least one selected from the group consisting of oligomeric pentacene, poly(thienylene vinylene) and poly-3 alkylthiophene.

4. The substrate according to claim 1, wherein the integrated circuit is a contactlessly readable integrated circuit which can be read in an inductive or capacitive manner.

5. The substrate according to claim 1, wherein the substrate comprises a conductive security thread which is connected to the integrated circuit wherein the security thread is at least one of a contact for readout operations and a contact for current supply.

6. The substrate according to claim 1, wherein the integrated circuit comprises a code of an intrinsic property of the substrate, which code, after the security paper has been produced, is arranged in the integrated circuit.

7. The substrate according to claim 6, wherein the code is an encrypted code.

8. The substrate according to claim 1, wherein the substrate comprises one or more additional security features.

9. The substrate according to claim 1, further comprising at least one additional security feature selected from the group consisting of a dye, a fluorescence material, a luminescent material and a phosphorescent material.

10. The substrate according to claim 1, which is a banknote.

11. The substrate according to claim 10 having a thickness up to 100 μm.

12. The substrate according to claim 1, which is a security paper.

13. The substrate according to claim 1, wherein the paper comprises natural fibers.

14. The substrate according to claim 1, wherein the optically active element is connected to the integrated circuit by one or more conductive connections.

15. The substrate according to claim 14, wherein the conductive connection is at least one of a conductive metal and a conductive polymer.

16. The substrate according to claim 1, comprising, in the following order, a paper substrate, the integrated circuit, and the optically active element covering the integrated circuit, wherein the optically active element comprises at least two conductive portions separated by a non-conductive portion.

17. The substrate according to claim 16, wherein at least one of the conductive portions is covered by a chemically inert layer and the integrated circuit is powered capacitively.

18. The substrate according to claim 16, wherein the integrated circuit is in direct contact with the substrate, both conductive portions of the optically active element, the non-conductive portion separating the conductive portions of the optically active elements are in contact with the integrated circuit, and the optically active element is further in direct contact with the substrate.

19. The substrate according to claim 16, further comprising a security thread having a conductive portion in contact with each conductive portion of the optically active element and separated by the non-conductive portion of the optically active element.

20. The substrate according to claim 1, wherein the conductive portions are protected by a chemically inert, electrically non-conductive layer.

21. An optically active element, comprising:
a flexible integrated circuit made from a semiconductive organic polymer,
wherein one or more parts of the optically active element are conductive parts for read out and current supply of the integrated circuit.

22. The optically active element according to claim 21, wherein the conductive parts are protected by a chemically inert, electrically non-conductive layer.

* * * * *